(12) United States Patent
Raffaelli

(10) Patent No.: US 11,794,844 B2
(45) Date of Patent: Oct. 24, 2023

(54) RIDING-SADDLE MOTOR VEHICLE WITH TWO REAR WHEELS

(71) Applicant: PIAGGIO & C. S.p.A., Pisa (IT)

(72) Inventor: Andrea Raffaelli, Pisa (IT)

(73) Assignee: PIAGGIO & C. S.P.A, Pontedera (IT)

( * ) Notice: Subject to any disclaimer, the term of this patent is extended or adjusted under 35 U.S.C. 154(b) by 0 days.

(21) Appl. No.: 17/277,389

(22) PCT Filed: Oct. 17, 2019

(86) PCT No.: PCT/IB2019/058858
§ 371 (c)(1),
(2) Date: Mar. 18, 2021

(87) PCT Pub. No.: WO2020/079634
PCT Pub. Date: Apr. 23, 2020

(65) Prior Publication Data
US 2021/0354773 A1   Nov. 18, 2021

(30) Foreign Application Priority Data

Oct. 18, 2018   (IT) .......................... 102018000009558

(51) Int. Cl.
*B62K 5/027*   (2013.01)
*B62K 5/00*   (2013.01)

(52) U.S. Cl.
CPC ........ *B62K 5/027* (2013.01); *B62K 2005/001* (2013.01)

(58) Field of Classification Search
CPC .. B62K 5/027; B62K 5/025; B62K 2005/001; B62D 12/00; B62D 9/02; B62D 61/08; B60G 21/007; B60G 2300/122
See application file for complete search history.

(56) References Cited

U.S. PATENT DOCUMENTS 3,605,929 A * 9/1971 Rolland ................. B62D 61/08
                                                280/DIG. 5
4,678,058 A    7/1987 Wooters
(Continued)

FOREIGN PATENT DOCUMENTS

CN   102463884 A   5/2012
CN   103010362 A   4/2013
(Continued)

OTHER PUBLICATIONS

JPS61125973 English Translation and Original document retrieved from Espacenet (Year: 1984).*
(Continued)

*Primary Examiner* — Drew J Brown
*Assistant Examiner* — Caitlin Anne Miller
(74) *Attorney, Agent, or Firm* — CANTOR COLBURN LLP

(57) ABSTRACT

Riding-saddle motor vehicle including a front frame which extends along a longitudinal direction having at least one front wheel, a rear frame having a pair of rear wheels mounted on opposite sides of a rear wheel axis, a motor unit mounted on board the front frame and adapted to provide a driving torque to the pair of rear wheels and/or the front wheel, where the motor unit is connected to the rear wheel axis by means of an articulated transmission joint adapted to allow a relative rotation, around the longitudinal direction, between the front frame and the rear frame, and transmit a driving torque to the pair of rear wheels.

11 Claims, 15 Drawing Sheets

(56) References Cited

U.S. PATENT DOCUMENTS

| | | | | |
|---|---|---|---|---|
| 6,276,480 | B1* | 8/2001 | Aregger | B62D 37/00 |
| | | | | 280/62 |
| 7,311,167 | B2* | 12/2007 | Takayanagi | B60G 21/007 |
| | | | | 180/215 |
| 8,668,037 | B2* | 3/2014 | Shinde | B62K 5/025 |
| | | | | 180/68.5 |
| 8,678,123 | B2* | 3/2014 | Tako | B62J 17/08 |
| | | | | 180/215 |
| 9,475,535 | B2* | 10/2016 | Iizuka | B62K 5/10 |
| 10,526,033 | B2* | 1/2020 | Horiguchi | B62K 5/10 |
| 11,198,482 | B2* | 12/2021 | Sugioka | B62J 45/40 |
| 2012/0118659 | A1 | 5/2012 | Shinde | |
| 2013/0168944 | A1* | 7/2013 | Bartolozzi | B62K 5/05 |
| | | | | 280/269 |
| 2016/0280329 | A1* | 9/2016 | Soatti | B62K 25/005 |
| 2018/0273135 | A1* | 9/2018 | Soatti | B62K 25/04 |
| 2022/0048588 | A1* | 2/2022 | Moroni | B60K 1/02 |

FOREIGN PATENT DOCUMENTS

| | | |
|---|---|---|
| CN | 105764788 A | 7/2016 |
| CN | 107531305 A | 1/2018 |
| CN | 108137095 A | 6/2018 |
| CN | 108137116 A | 6/2018 |
| EP | 2574531 A1 | 4/2013 |
| EP | 2767464 A1 | 8/2014 |
| FR | 3020334 A1 | 10/2015 |
| JP | 5950882 A | 3/1984 |
| JP | 59128074 A | 7/1984 |
| JP | 6045127 U | 3/1985 |
| JP | 61125973 A | 6/1986 |
| JP | 2005219728 A * | 8/2005 ............... B62K 5/00 |
| JP | 2005313875 A | 11/2005 |
| JP | 2010143269 A * | 7/2010 ........... B60G 21/007 |
| JP | 2010143269 A | 7/2010 |
| JP | 2011201431 A | 10/2011 |
| WO | 2005095142 A1 | 10/2005 |
| WO | 2011118465 A1 | 9/2011 |
| WO | 2013051195 A1 | 4/2013 |

OTHER PUBLICATIONS

Chinese Office Action for corresponding application No. 201980068388. X; dated Jan. 25, 2022.

International Search Report for corresponding application PCT/IB2019/058858 filed Oct. 17, 2019; dated Dec. 10, 2019.

Taiwan IPO Examination Report, Issue No. 11220441670 dated May 8, 2023.

Office Action for corresponding Japanese application 2021-515641; Report dated Aug. 1, 2023.

* cited by examiner

RIDING-SADDLE MOTOR VEHICLE WITH TWO REAR WHEELS

TECHNICAL FIELD

The present disclosure relates to a riding-saddle motor vehicle, with at least three wheels, comprising two rear wheels.

BACKGROUND

As is known, motor vehicles with two rear wheels are used not only for transporting passengers but also and above all for transporting objects, having a considerable load capacity and stability due to the presence of the rear wheels paired with each other.

The known motor vehicles have a front frame which includes at least one front wheel and a rear frame which includes the pair of rear wheels.

A motor unit is mounted on the rear frame in such a way that the front frame is able to tilt with respect to the median plane of the motor vehicle. This kinematics allows facing the curves as in a normal two-wheeled motor vehicle and at the same time being able to carry a load on the rear axle at the rear wheels keeping it practically independent of the front end.

However, the provision of the motor unit on the rear axle which includes the pair of rear wheels implies some drawbacks.

The biggest problem lies in that since the rear axle does not roll, while driving and facing curves it is subject to a centrifugal force that pushes it outwards, just like in a car. Therefore, the greater this effect is, the more the independence of the front axle to perform roll movements is nullified.

In order to limit the inclination towards the outside, the rear axle of these motor vehicles is provided with a rigid axle, without independent suspensions on the pair of rear wheels, precisely because otherwise in the curve the rear axle would roll in counter-phase against the front.

Arranging independent suspensions on this type of motor vehicle means that in a curve one of the rear wheels, the internal one with respect to the direction of the curve, tends to rise with respect to the ground, completely losing its grip.

In the known solutions, there are typically two alternatives: the engine is locked with the rigid rear axle and therefore the torque exchanged between the engine and the rigid rear axle is internal to the power unit and does not create problems of trim variation; or the motor rolls together with the frame and the front wheel (or front wheels) while the transverse transmission axis between the rear wheels remains parallel to the ground. In the latter case, the torque which causes the vehicle to roll off as a reaction only arises if the two parts are separated from each other and the connection that joins them provides for an exchange of torque with respect to a longitudinal axis.

Therefore, the known solutions typically provide for the use of a motor with a transversal output axis (for torque gripping), kinematically connected to the rear driving wheels so as to transmit the torque according to a longitudinal axis. In other words, the transmission torque to the rear wheels is delivered on a longitudinal axis, parallel to the direction of travel.

In this condition, although the vehicle is equipped with two rear wheels paired with each other, the reaction torque, which will obviously be on the same direction as the driving torque, but with the opposite direction, will tend to cause the vehicle to roll, or rather the frame portion of the vehicle having the degree of freedom of rotation with respect to the rear wheel axle.

The roll of the vehicle, as a result of the driving torque, tends to destabilize the vehicle especially in the case of a three-wheeled vehicle, of which two paired rear wheels, which was created to increase the load capacity of the motorbike with a rideable saddle and which, therefore, often travels in conditions of high load.

Furthermore, this tendency to roll significantly worsens the driving feeling of the driver.

BRIEF SUMMARY

The need of solving the drawbacks and limitations mentioned with reference to the prior art is therefore felt.

Such a need is met by a riding-saddle motor vehicle including a front end frame extending along a longitudinal direction having at least one front wheel; a rear axle frame having a pair of rear wheels mounted on opposite sides of a rear wheel axle, a motor unit mounted on board said front end frame and adapted to provide a driving torque to said pair of rear wheels and/or to said front wheel, wherein said motor unit is connected to said rear wheel axis by means of an articulated transmission joint adapted to: allowing a relative rotation, around said longitudinal direction, between said front end frame and said rear frame, and transmitting a driving torque to said pair of rear wheels.

DESCRIPTION OF THE DRAWINGS

Further features and advantages of the present disclosure will appear more clearly from the following description of preferred non-limiting embodiments thereof, in which.

Elements or parts of elements in common to the embodiments described below are referred to with the same reference numerals.

DETAILED DESCRIPTION

Figure 1:
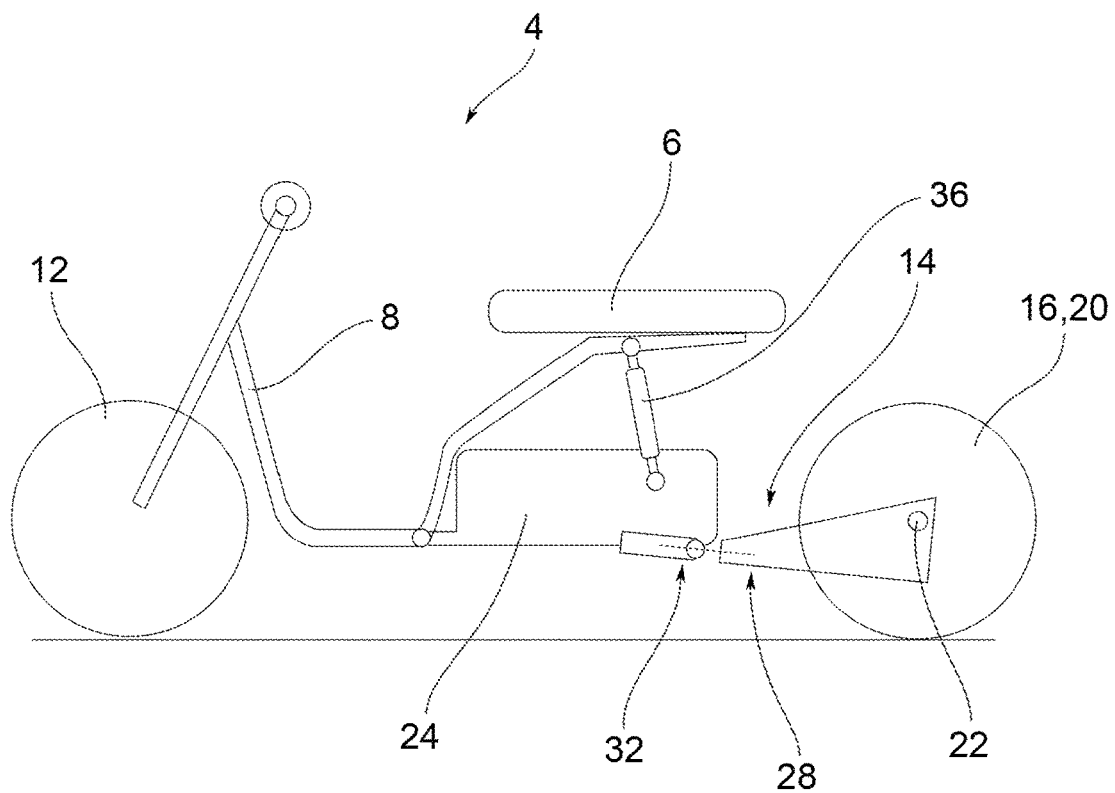
FIGS. 1-2 show side views of a riding-saddle motor vehicle according to two embodiments of the present disclosure.
Figure 2:
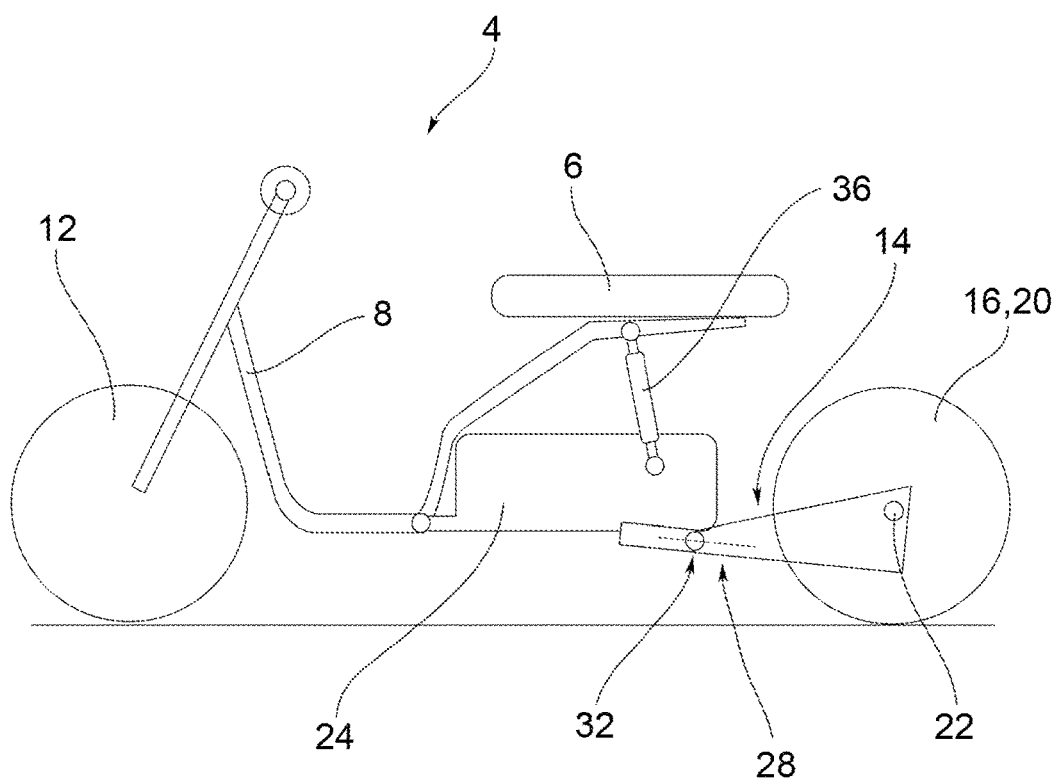
Figure 3:
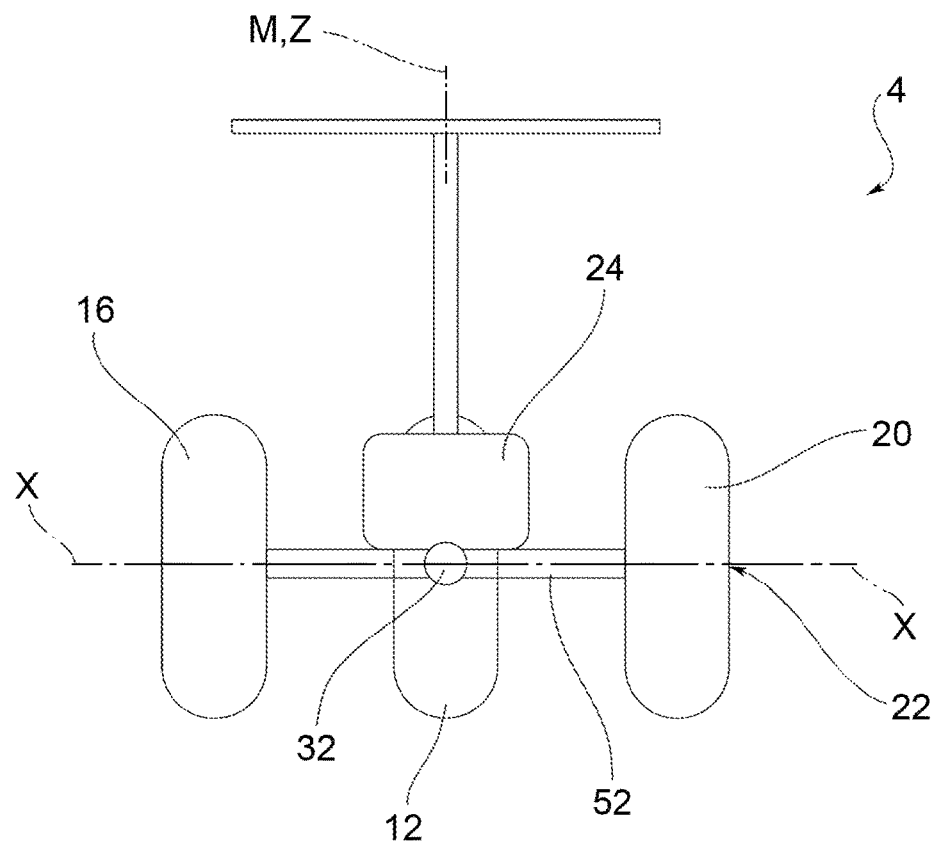
FIGS. 3-4 show schematic rear views of a riding-saddle motor vehicle with a rigid rear axle, in a straight configuration or straight travel and in rolling step, respectively.
Figure 4:
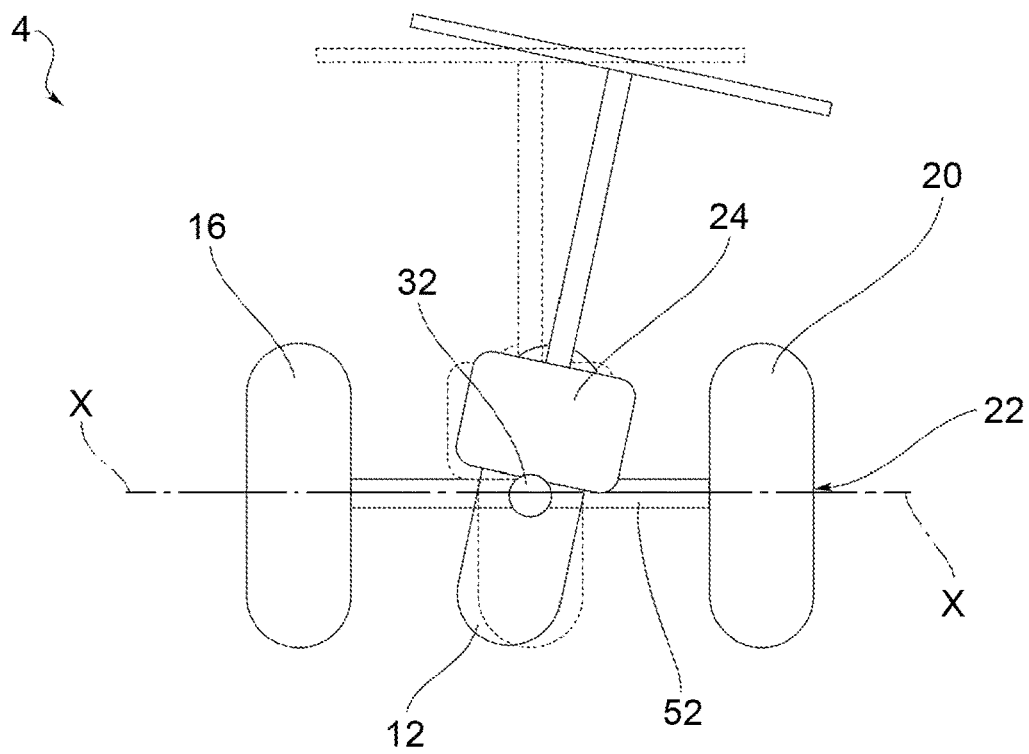
Figure 5:
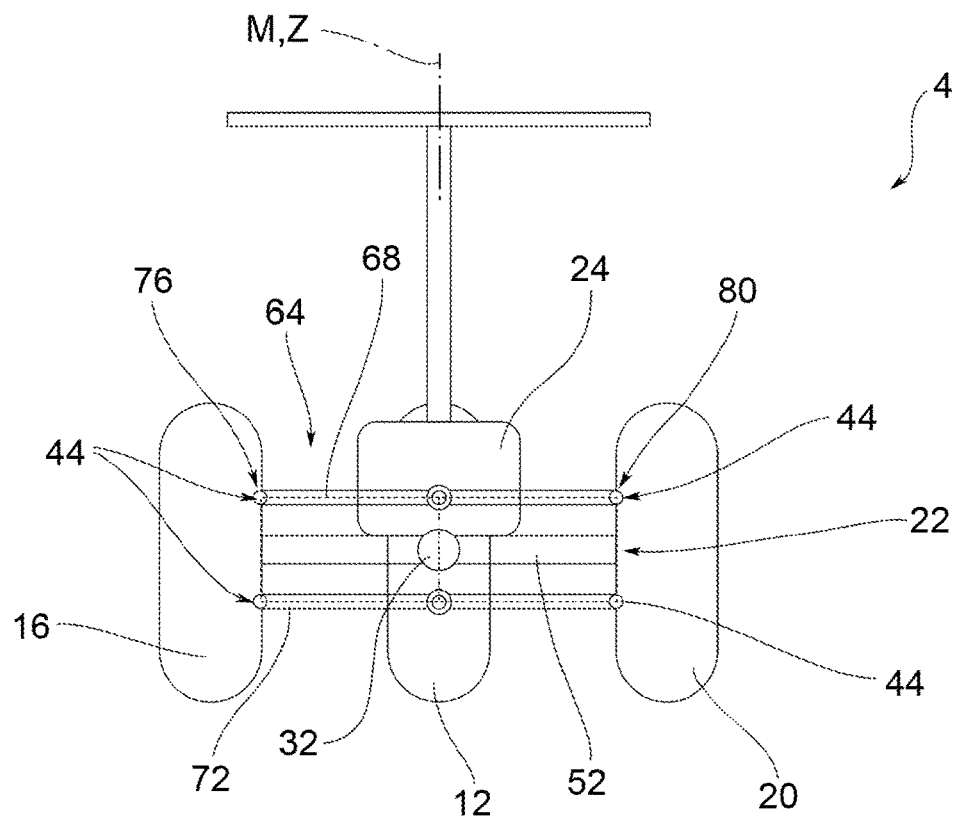
FIGS. 5-6 show schematic rear views of a riding-saddle motor vehicle with a rear rolling kinematic mechanism with a double support arm, in a straight configuration or straight travel and rolling step, respectively.
Figure 6:
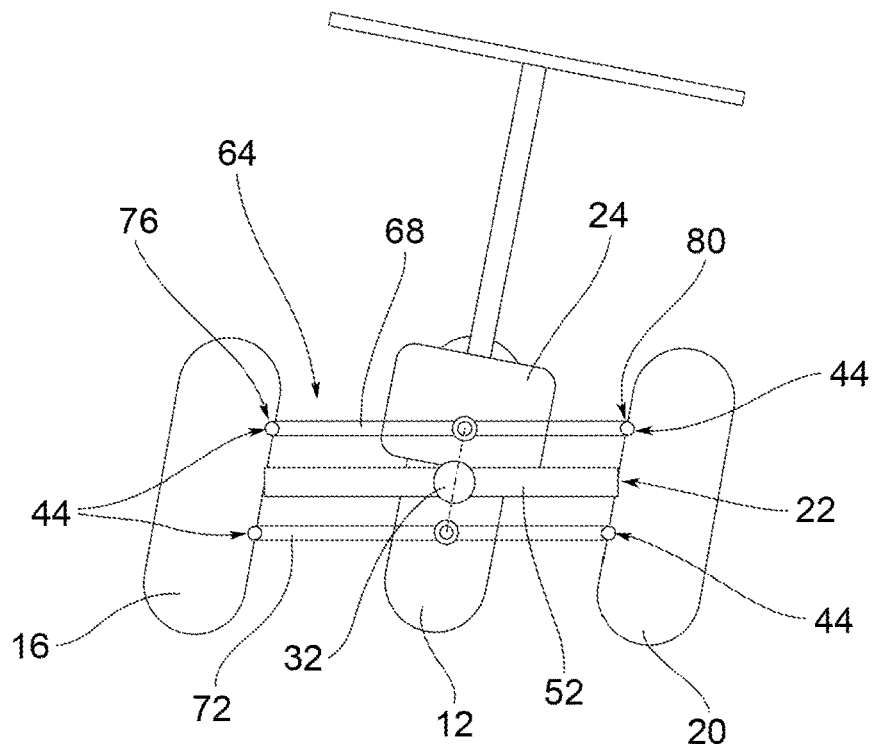
Figure 7:
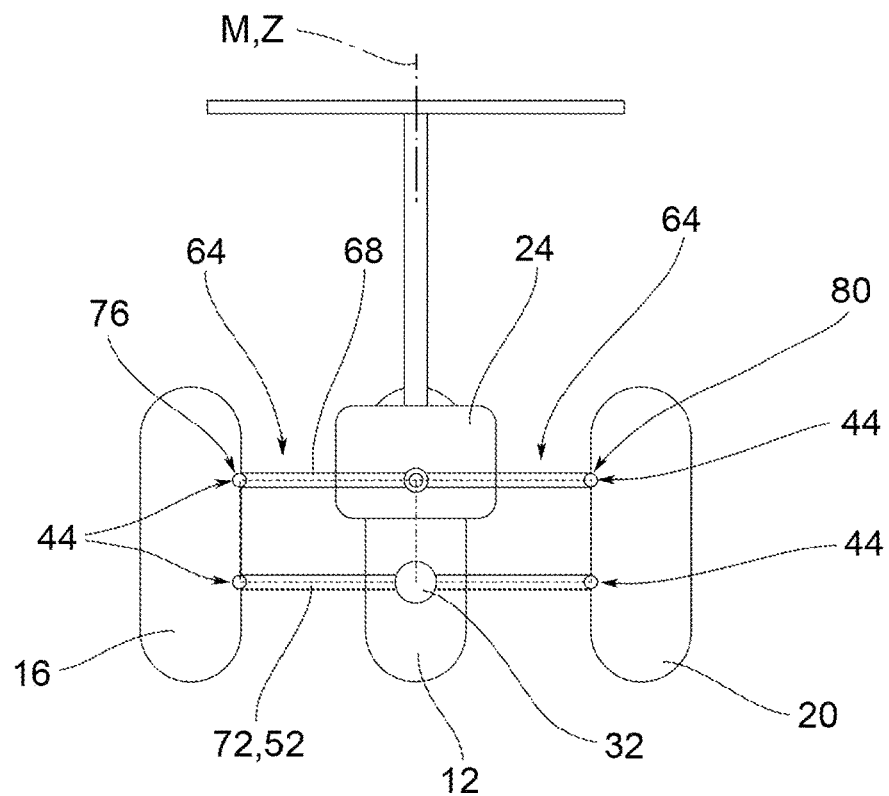
FIGS. 7-8 show schematic rear views of a riding-saddle motor vehicle with a rear rolling kinematic mechanism with a single support arm with a rigid axle, in a straight configuration or straight travel and rolling step, respectively.
Figure 8:
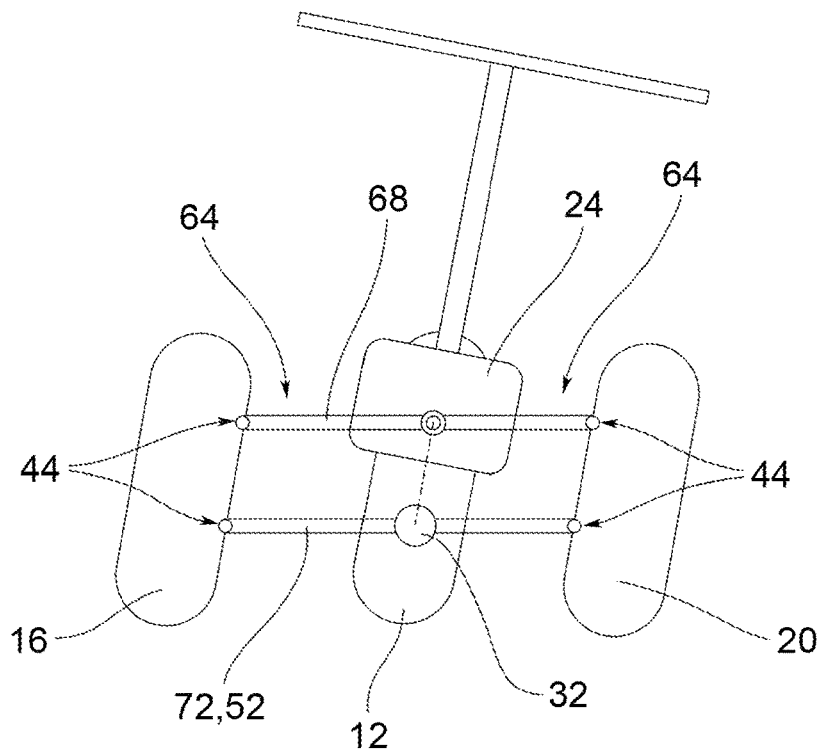
Figure 9:
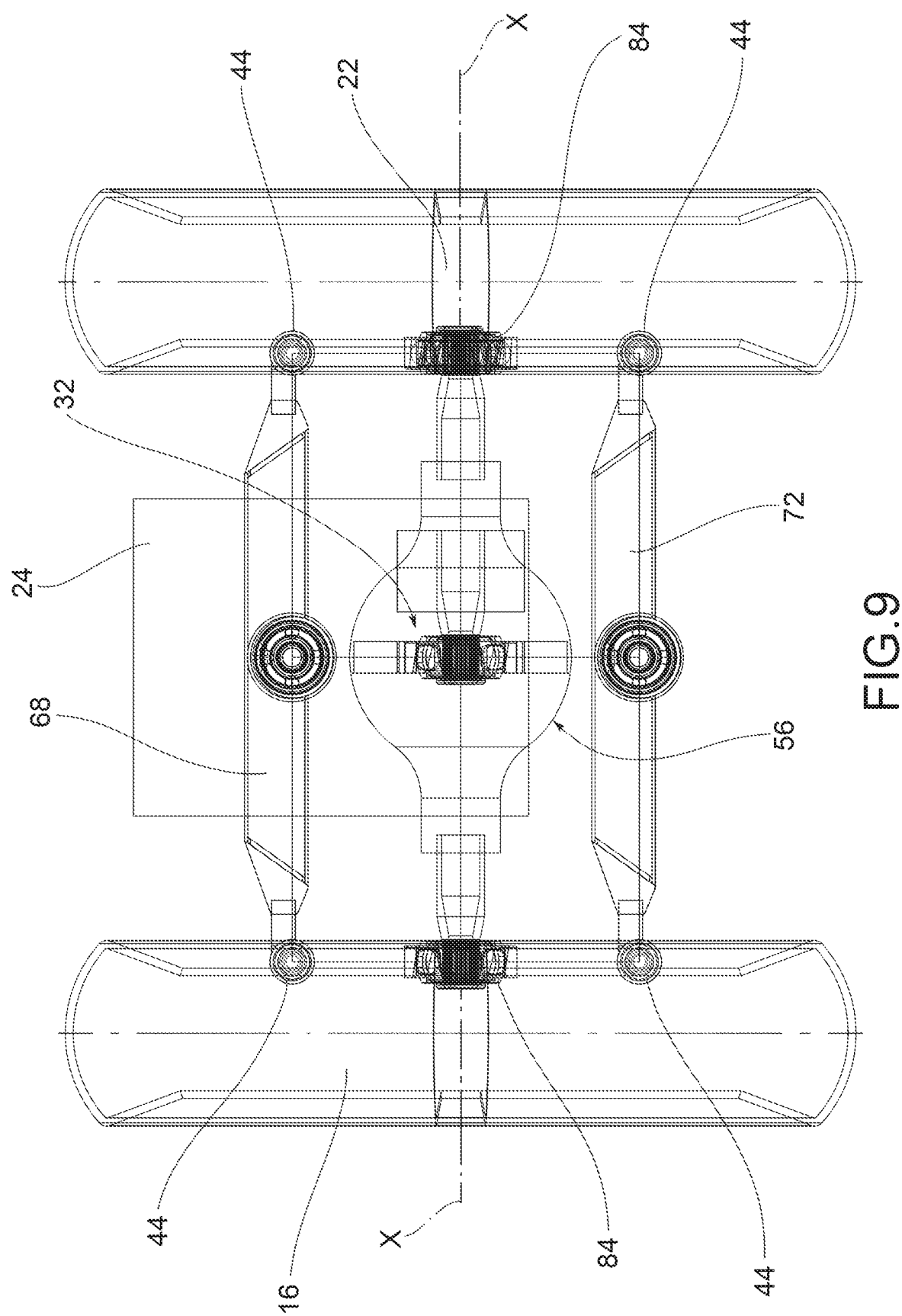
FIGS. 9-19 show further perspective, side and rear views of a riding-saddle motor vehicle according to possible embodiments of the present disclosure, in straight configuration and in inclined or roll configuration.
Figure 10:
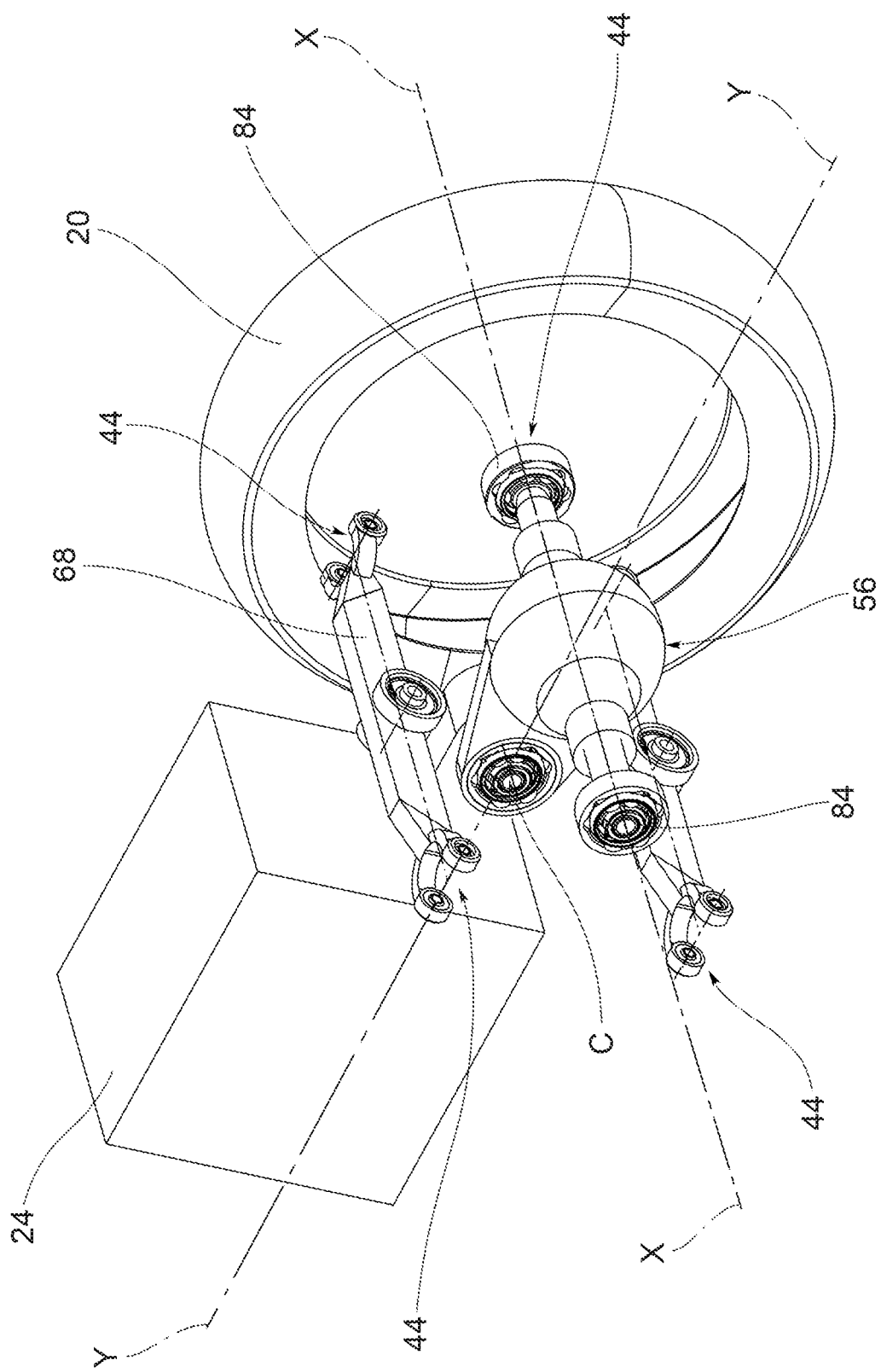
Figure 11:
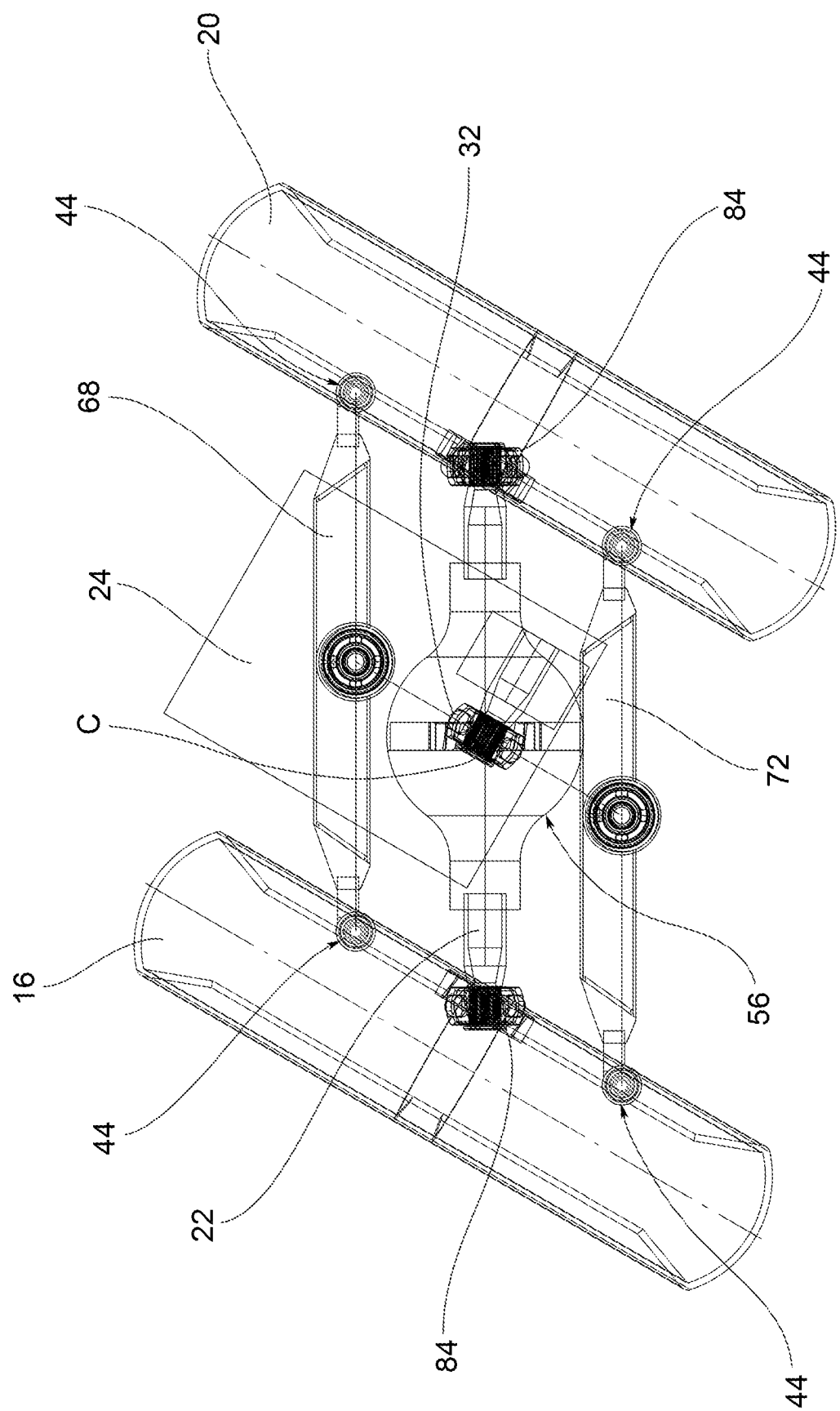
Figure 12:
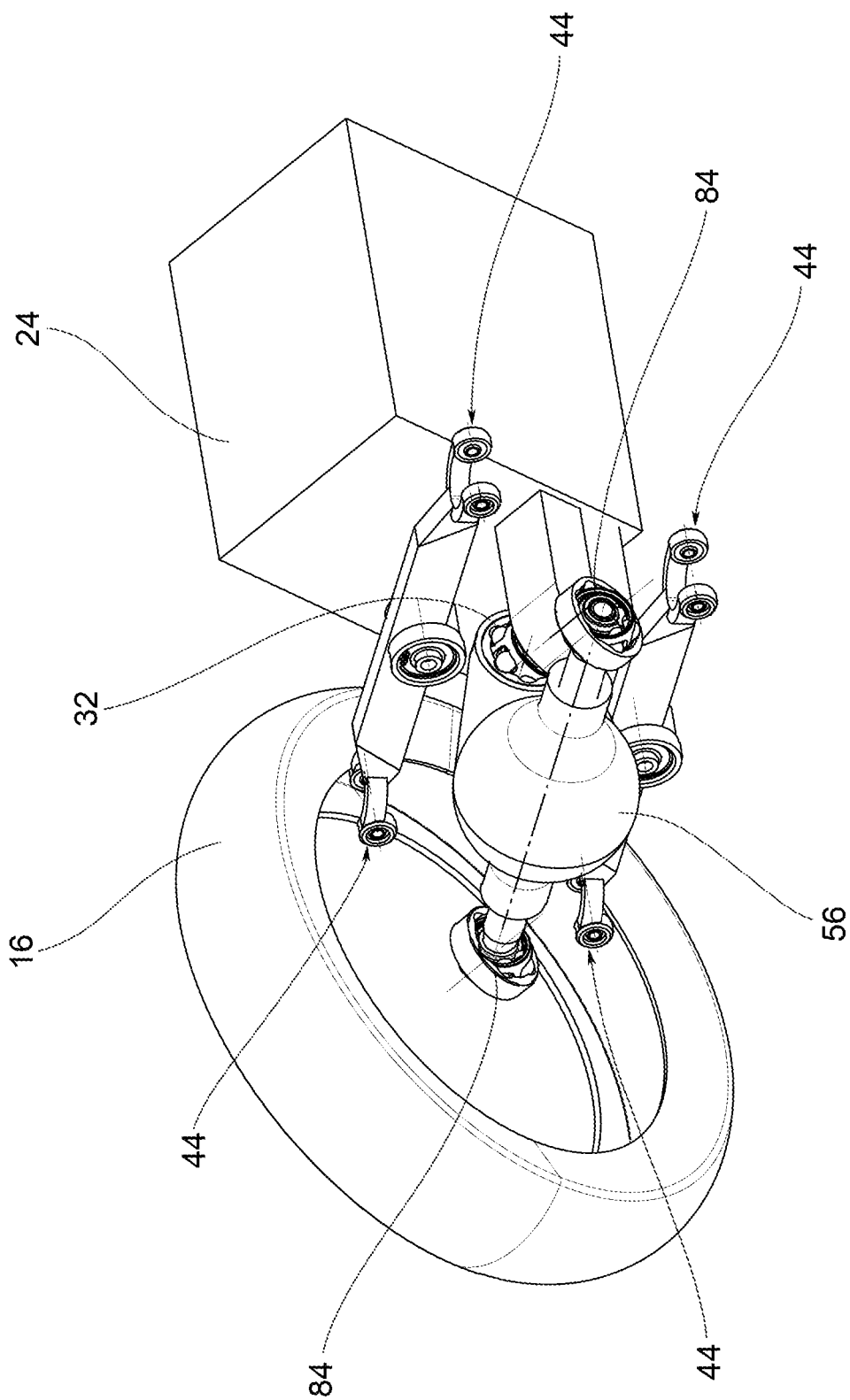
Figure 13:
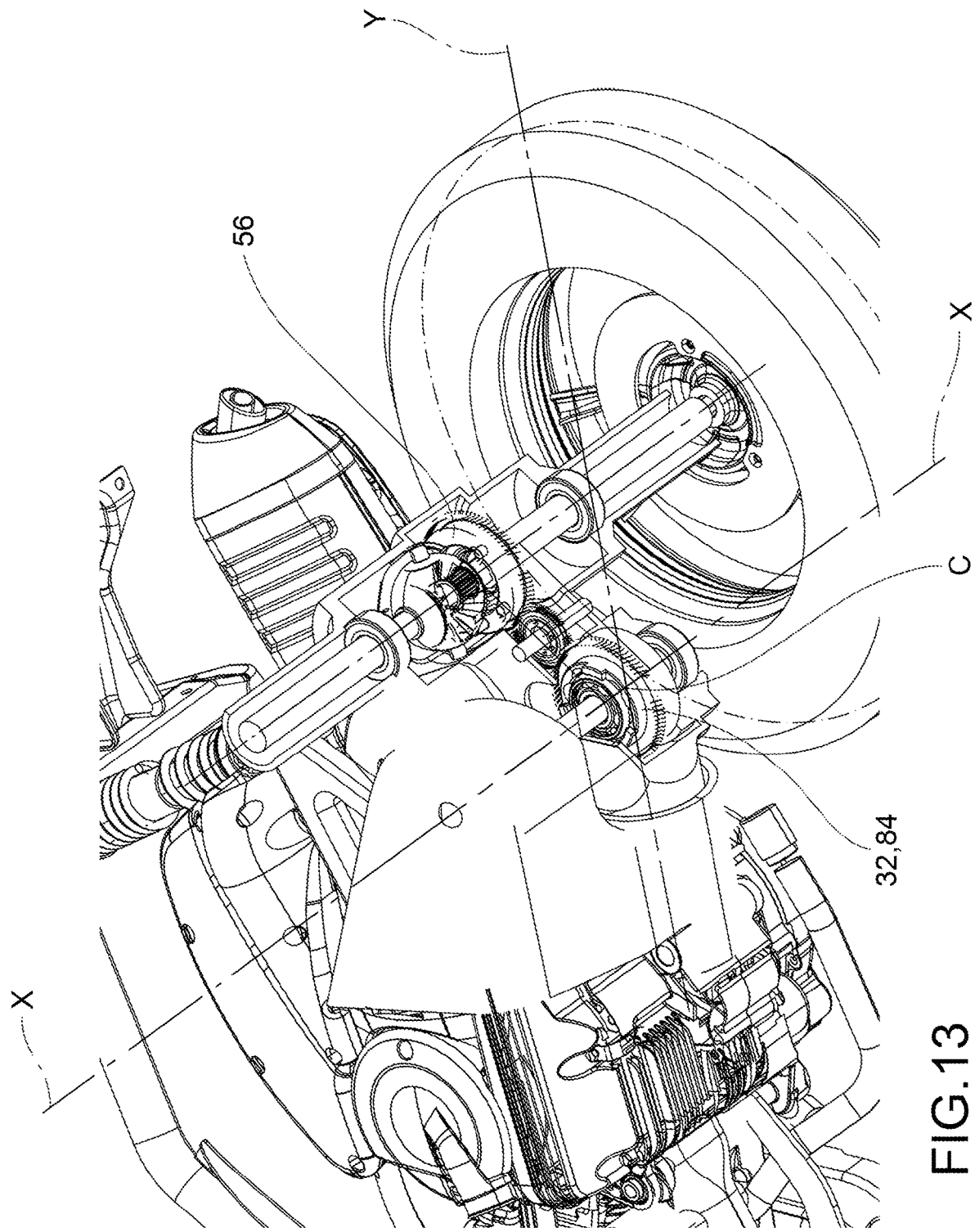
Figure 15:
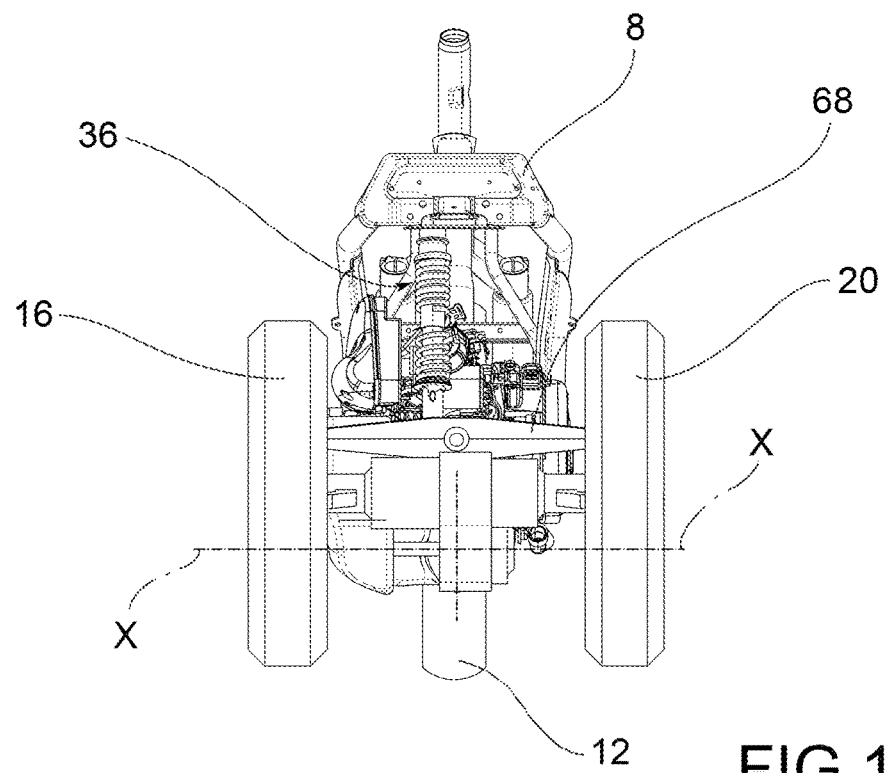
Figure 14:
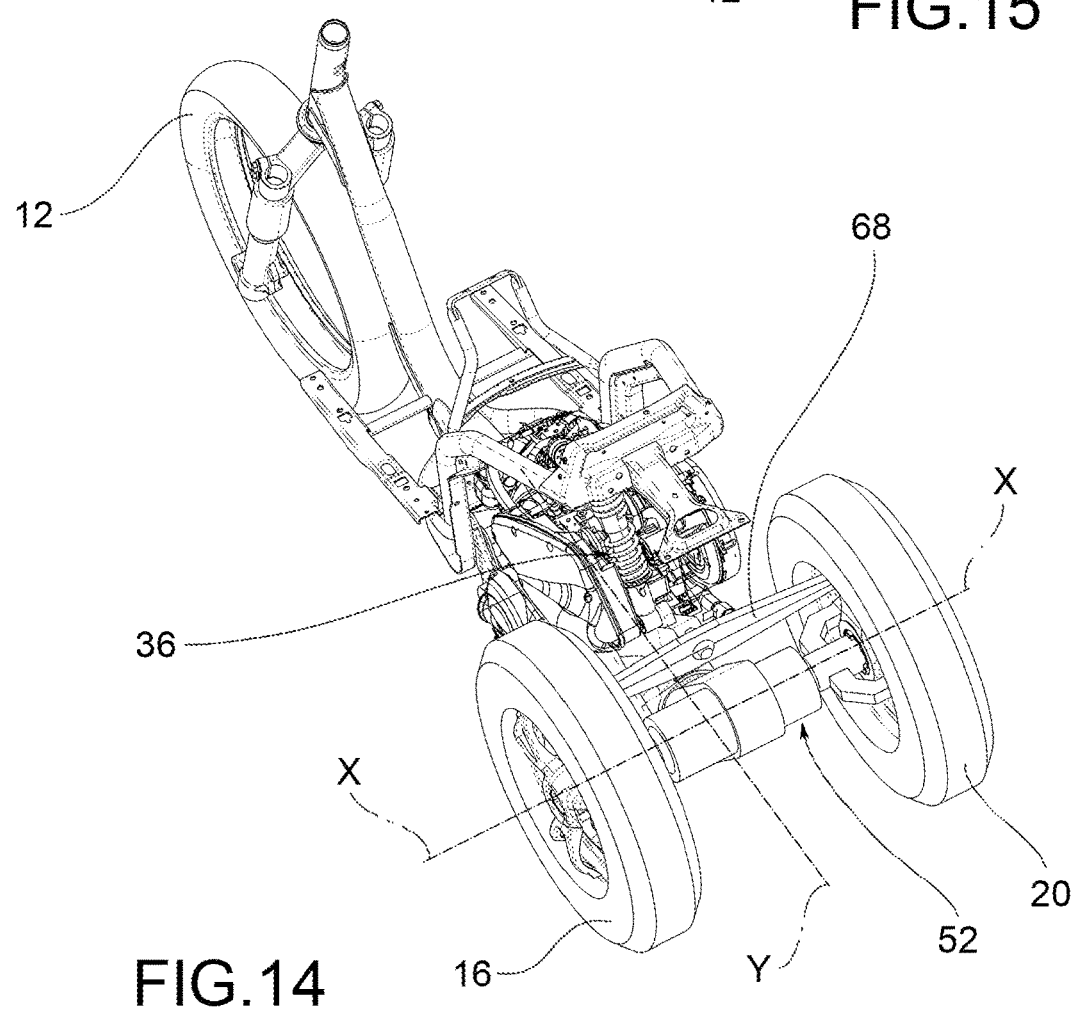
Figure 16A:
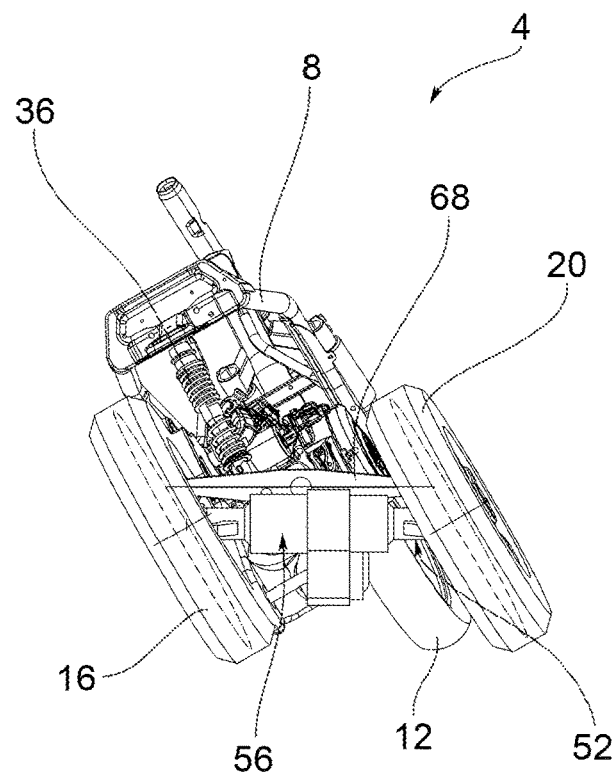
Figure 16B:
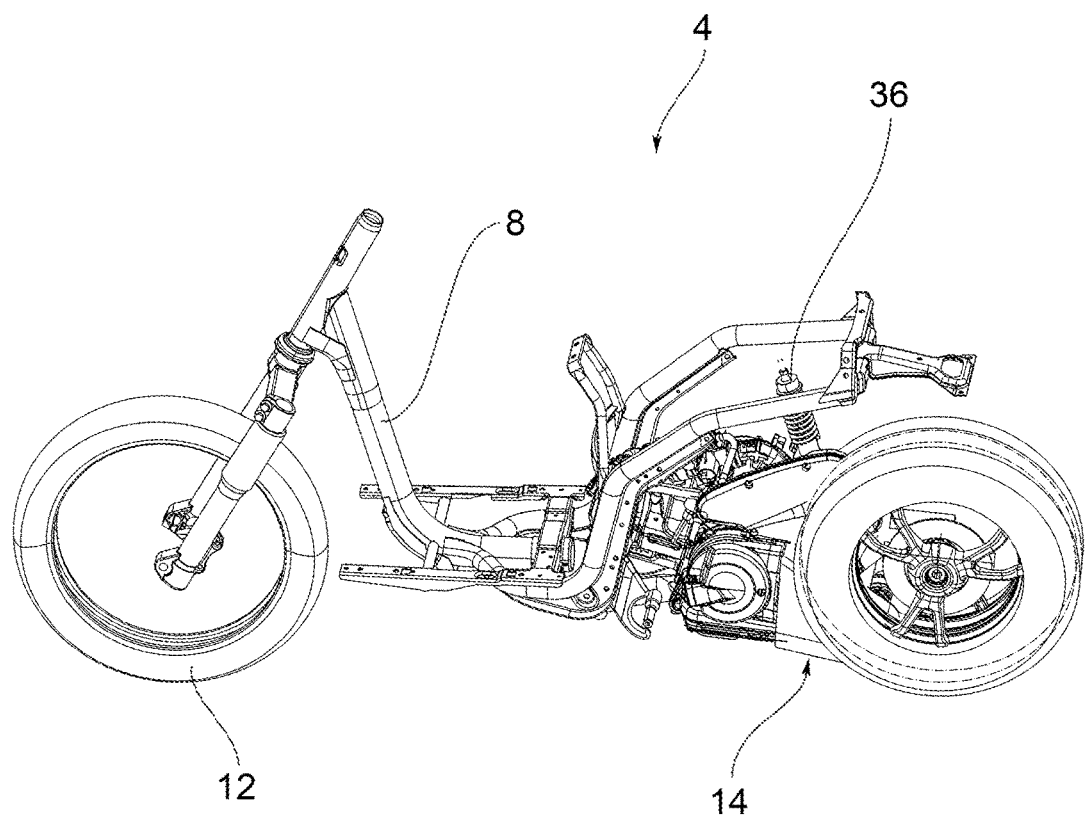
Figure 17A:
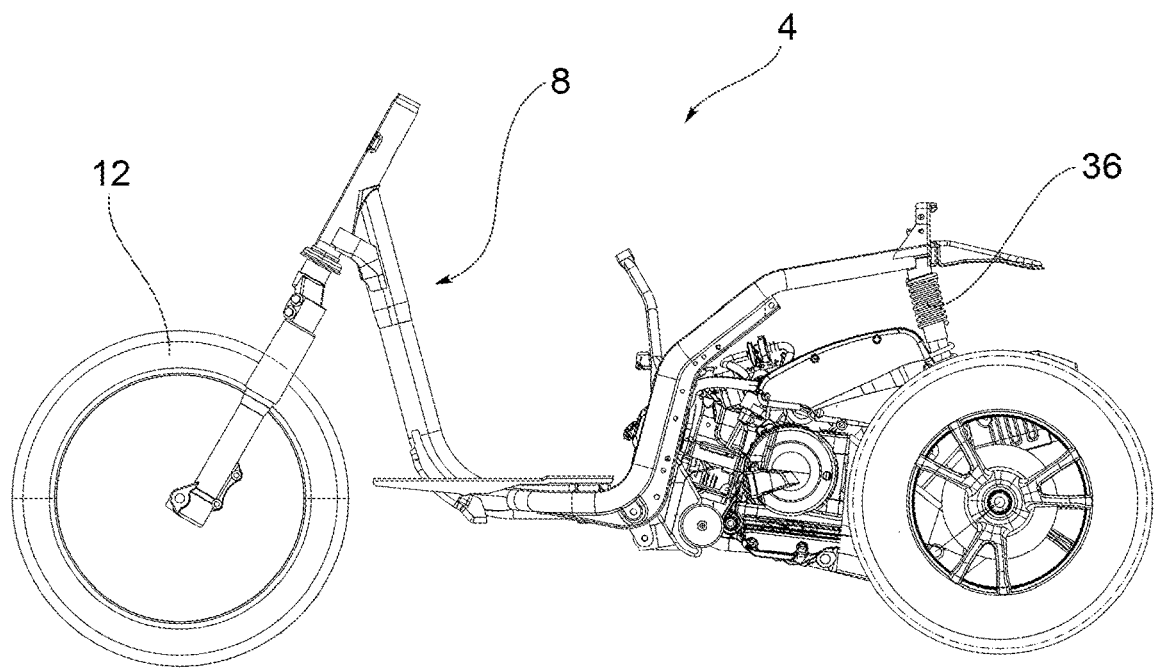
Figure 17B:
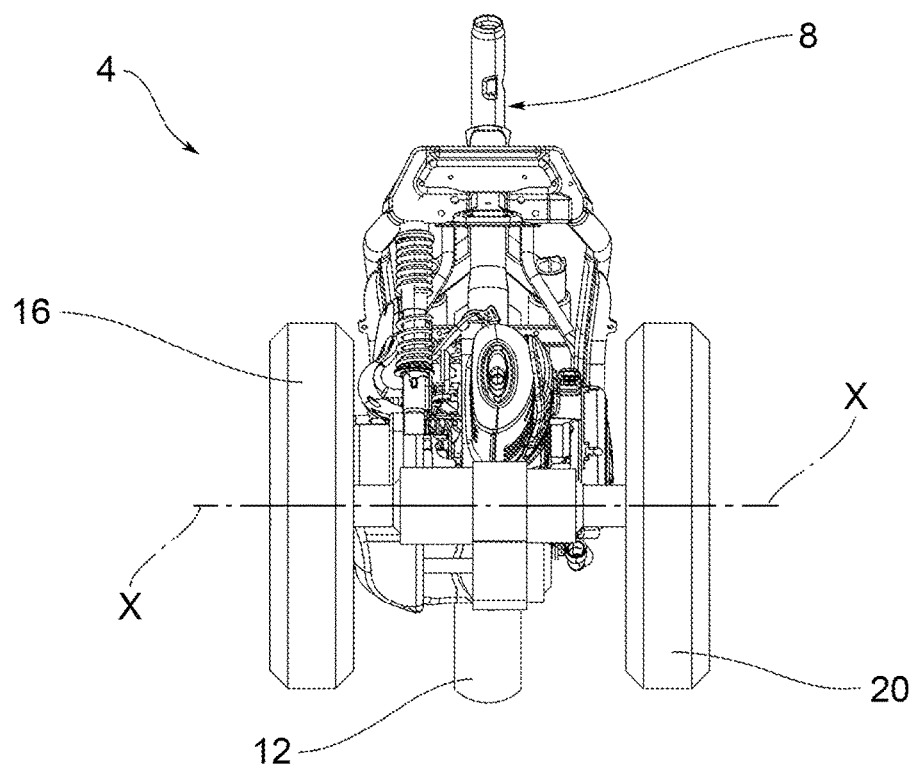
Figure 18A:
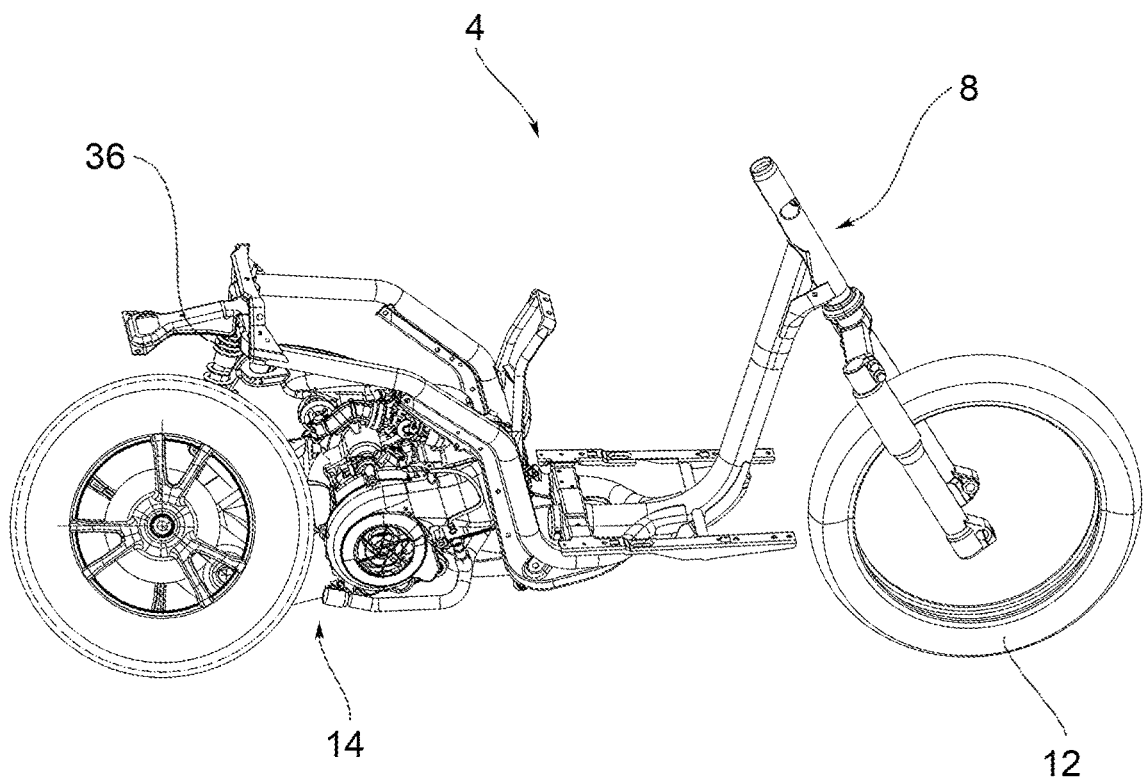
Figure 18B:
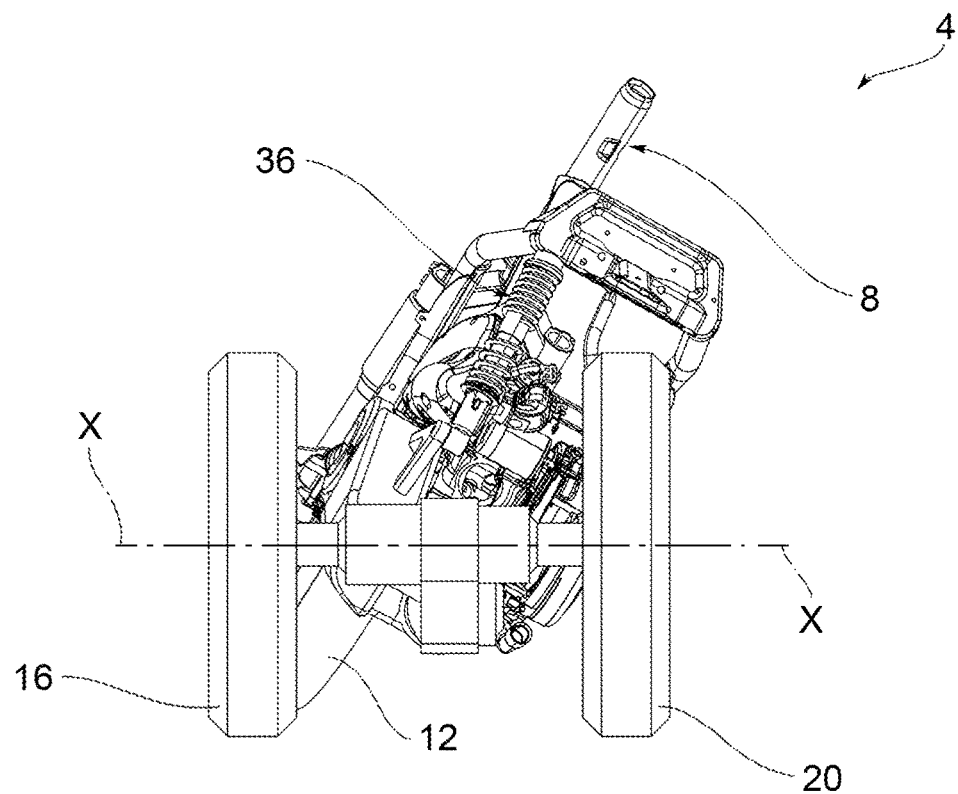
Figure 19A:
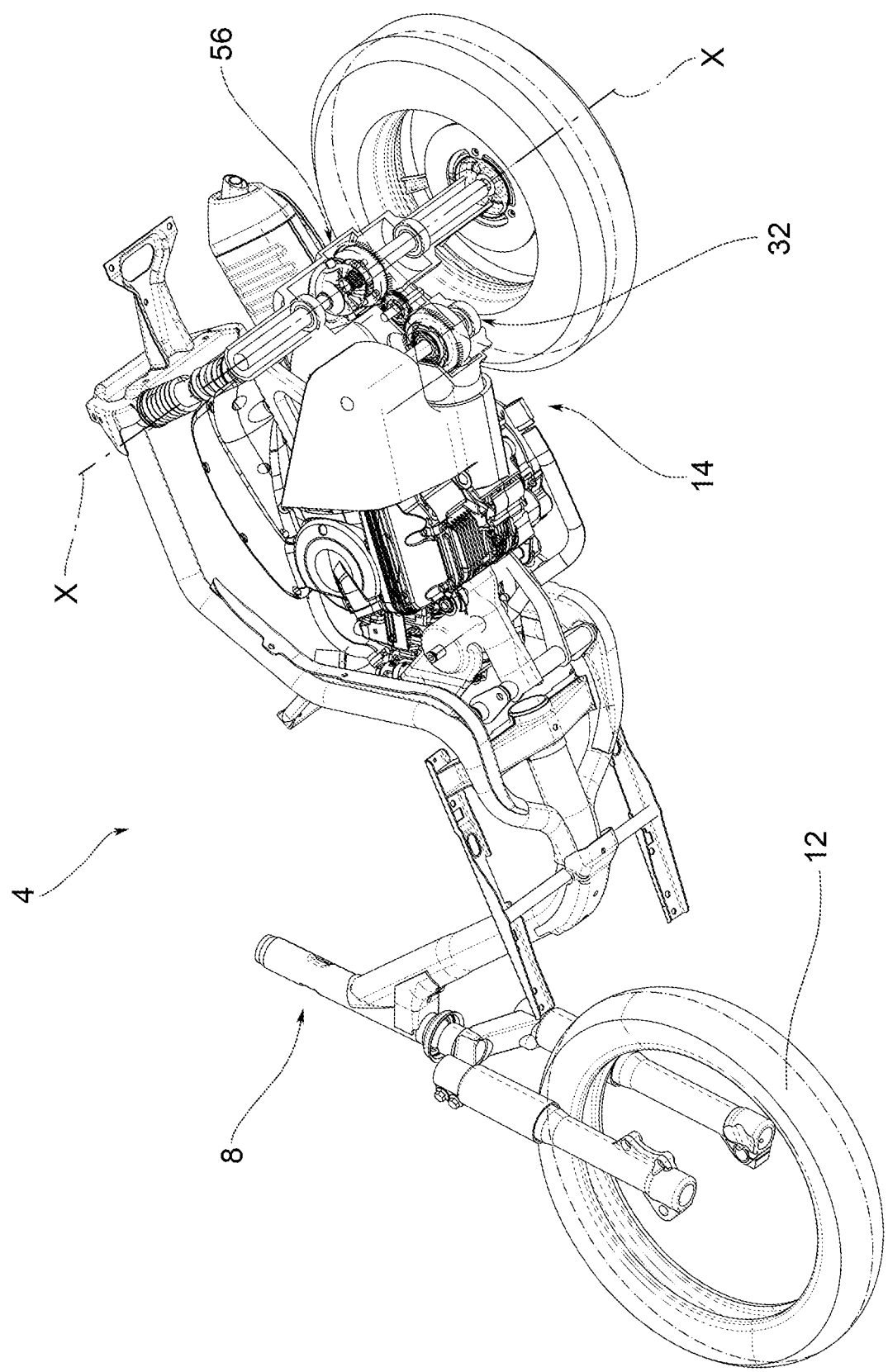
Figure 19B:
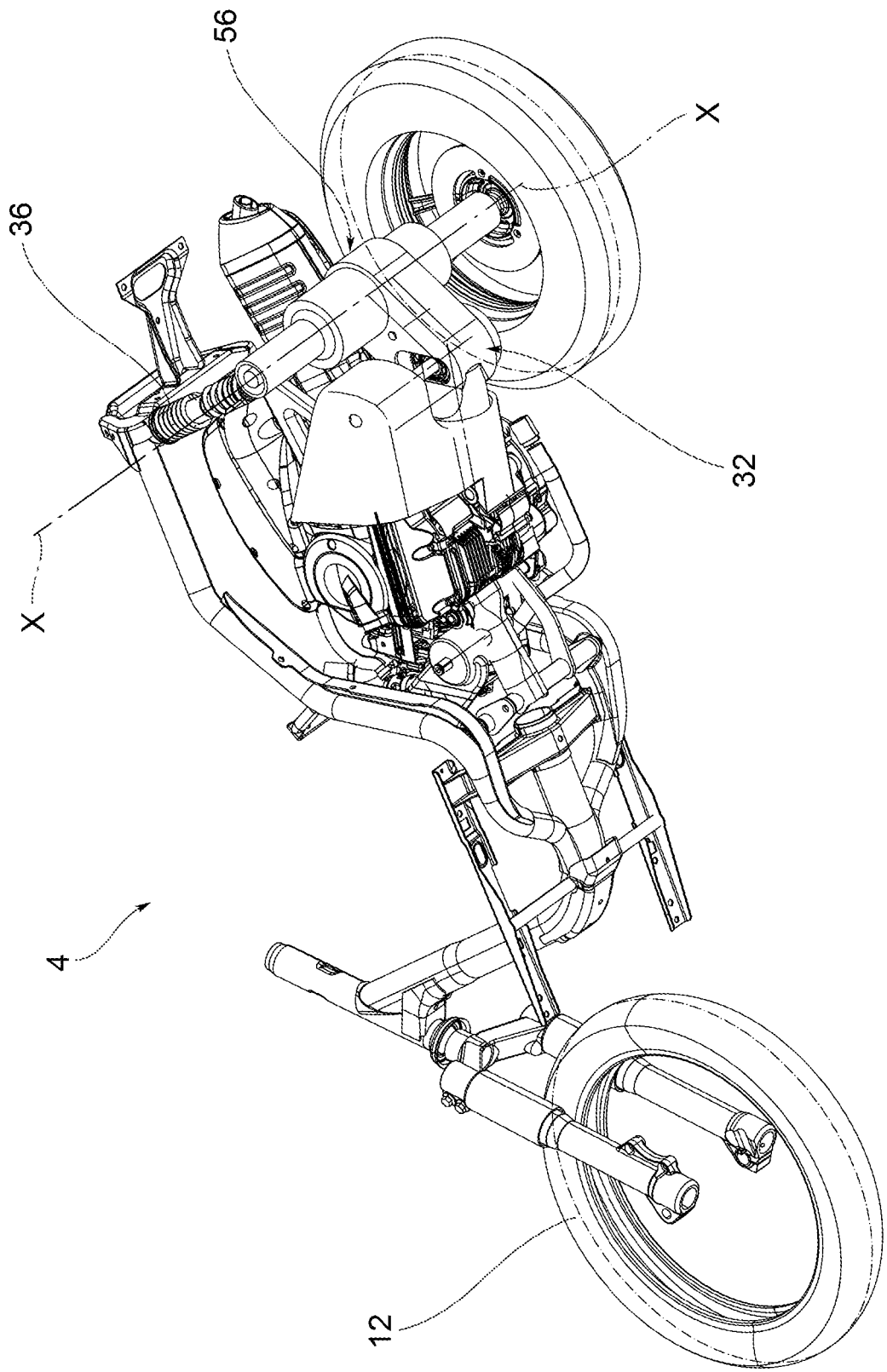

With reference to the above figures, reference numeral 4 indicates as a whole an overall schematic view of a riding-saddle motor vehicle according to the present disclosure.

For the purposes of the present disclosure, it should be pointed out that the term riding-saddle motor vehicle must be understood in a broad sense, without limitations in terms of dimensions, materials, motor size and type of engine.

The definition of riding-saddle means that the motor vehicle is provided with a saddle 6 and that the driving user is disposed as a rider of the saddle itself, in particular with the legs arranged on laterally opposite sides with respect to the saddle.

The riding-saddle motor vehicle 4 comprises a front end frame 8 which extends along a longitudinal direction Y-Y and which rotatably supports at least one front wheel 12. The front wheel 12 is typically a steering wheel; it is also possible to provide a quadricycle having two front steering wheels which can be connected together so as to be rigidly connected or connected by means of an articulated quadrilateral.

The motor vehicle also comprises a rear axle frame 14 having a pair of rear wheels 16, 20 mounted on opposite sides of a rear wheel axis 22.

The rear wheels 16, 20 are rotatably supported in a known manner on bearings so as to rotate around the rear wheel axis 22, arranged perpendicularly to said longitudinal direction Y-Y.

The riding-saddle motor vehicle 4 further comprises a motor unit 24 mounted on board said front frame 8 and adapted to provide a driving torque to said pair of rear wheels 16, 20 and/or to said front wheel 12.

Advantageously, the motor unit 24 is connected to said rear wheel axis 22 by means of an articulated transmission joint 32 adapted to allow a relative rotation, around said longitudinal direction Y-Y, between said front frame 8 and said rear frame 14, and adapted to transmit a driving torque to said pair of rear wheels 16, 20.

In particular, with reference to the transmission of the torque to the wheels, said pair of rear wheels 16, 20 comprises a transmission shaft 28 adapted to provide a driving torque to the rear wheels 16, 20 themselves; the transmission shaft 28 extends in a transverse direction X-X, perpendicular to said longitudinal direction Y-Y.

According to a possible embodiment, the transmission joint 32 is a homokinetic joint having a sphere center (C) placed on the intersection between the transverse direction X-X passing through the transmission shaft 28 and a direction parallel to the longitudinal direction Y-Y.

With this solution, said center will be placed very low, that is, close to the ground, since to have a good dynamic of the motorcycle, the rear axle axis is inclined so as to intercept the ground near the projection on the median plane of the contact point of the rear wheels 16, 20.

According to a further possible embodiment, the transmission joint 32 is a cardan joint which achieves an average homokinetic transmission ratio.

The type of tilting riding-saddle motor vehicle 4 can be various: for example the motor group 24 can be rigidly fixed to the front frame 8, or it is possible to provide/insert a suspension assembly 36 between the motor group 24 and the front end frame 8 itself. Said suspension assembly 36 can comprise a spring and/or a damper.

The geometry of the rear axle can also be varied. For example, said rear wheels 16, 20 can be connected to each other by means of a rigid axle 52 which defines said rear wheel axis 22.

Preferably, said pair of rear wheels 16, 20 is mounted on a roll kinematic mechanism 64 which allows them to roll with respect to a median plane M-M of the motor vehicle defined along said longitudinal direction Y-Y.

According to a possible embodiment, said roll kinematic mechanism 64 comprises at least a first support arm 68 and a second support arm 72 respectively connected at opposite ends 76, 80 (with respect to the transverse direction X-X) to a respective wheel 16, 20 of said pair of rear wheels 16, 20; in this embodiment the rigid axle 52 is arranged between said first and second support arm 68, 72, along a vertical direction Z-Z, perpendicular to the longitudinal direction Y-Y and to the transverse direction X-X.

According to a further possible embodiment, said roll kinematic mechanism 64 comprises a first support arm 68 and a rigid axle 52 which defines a second support arm 72.

Also in this case, the first support arm 68 and the rigid axle are connected at opposite ends 76, 80 (with respect to the transverse direction X-X) to a respective wheel 16, 20 of said pair of rear wheels 16, 20.

More in detail, the first support arm 68 and the second support arm 72 (and/or the rigid axle 52) are connected to said rear wheels 16, 20 by means of end hinges 44.

According to one embodiment, said end hinges 44 are longitudinal hinges so as to accommodate the rolling movement of the rear wheels 16, 20, if provided. These longitudinal hinges cooperate with homokinetic joints 84. In particular, said end hinges 44, arranged at the end of the transmission shaft 28, geometrically coincide with homokinetic joints 84.

In all the embodiments described above, the motorcycle can comprise a differential 56 which transmits the driving torque to said rear wheels 16, 20; said differential can also be of the self-locking type, of the mechanical type, with a viscous joint and/or electronic control.

The operation of a tilting riding-saddle motor vehicle according to the present disclosure shall now be described.

In particular, as seen, in the solution of the present disclosure the transmission of the driving torque takes place along a transverse axis. This means that, first of all, the reaction torque will in turn be directed in the transverse direction and will therefore be discharged on the front and rear wheels spaced apart from each other of the vehicle wheelbase. This reaction torque will therefore tend to generate a pitching moment that will be decidedly limited, precisely because, due to the relatively high pitch, it will generate traction/compression forces on the decidedly limited suspensions, especially if compared with those that would occur in the case in which the reaction torque was directed longitudinally.

In fact, in the case of the solutions of the known art in which the driving torque and therefore of the reaction are longitudinally directed, this torque is discharged on the rear wheels spaced apart from each other by a decidedly lower distance than the wheelbase; therefore the extent of the traction/compression forces will be extremely high, generating a very evident induced roll on the suspended masses of the riding-saddle motor vehicle. The solution of the present disclosure, on the other hand, does not induce any roll due to the acceleration/deceleration of the engine, limiting itself to inducing an extremely limited and practically imperceptible pitching for the driver.

At the same time, the transmission joint of the present disclosure, by allowing precisely the roll rotation, does not generate any roll caused between the frame and the rear wheels.

As can be appreciated from the description, the present disclosure allows overcoming the drawbacks of the prior art.

In fact, the transmission of the driving torque and therefore of the corresponding reaction torque takes place in a transverse and not a longitudinal direction: therefore, unlike the solutions of the prior art, there is no rolling caused by the acceleration and deceleration of the engine.

The only variation induced by the torque reaction to the driving torque is a completely negligible pitching movement that does not destabilize the vehicle's attitude and does not worsen the driving feeling: this movement is negligible because it is inversely proportional to the vehicle's wheelbase (which is decidedly greater than the track between the rear wheels paired with each other).

Therefore in the solution of the present disclosure the reaction to the torque transmitted by the motor results in a pitching and not a rolling reaction.

From the rolling point of view, there is no rolling induced also because the joint provided is a transmission joint that allows a relative rotation between the rear wheels and the frame around a longitudinal roll axis.

A man skilled in the art may make several changes and adjustments to the solutions described above in order to meet specific and incidental needs, all falling within the scope of protection defined in the following claims.

The invention claimed is:

1. Riding-saddle motor vehicle comprising:
a front end frame extending along a longitudinal direction having at least one front wheel;
a rear axle frame having a pair of rear wheels mounted on opposite sides of a rear wheel axle,
a motor unit mounted on board said front end frame and adapted to provide a driving torque to said pair of rear wheels and/or to said front wheel,
wherein said motor unit is connected to said rear wheel axis by means of an articulated transmission joint adapted to:
allowing a relative rotation, around said longitudinal direction, between said front end frame and said rear frame, and
transmitting a driving torque to said pair of rear wheels; and
wherein said pair of rear wheels is mounted on a roll mechanism which allows the pair of rear wheels to roll with respect to a median plane of the motor vehicle defined along said longitudinal direction, said roll mechanism comprising a first support arm and a second support arm respectively connected at opposite ends to a respective wheel of said pair of rear wheels, said first support arm and second support arm being connected to said rear wheels by end hinges, where said end hinges are longitudinal hinges so as to accommodate a rolling movement of said pair of rear wheels.

2. Riding-saddle motor vehicle according to claim 1, wherein said pair of rear wheels comprises a transmission shaft adapted to provide a driving torque to the rear wheels, wherein said transmission shaft extends in a transverse direction with respect to said longitudinal direction.

3. Riding-saddle motor vehicle according to claim 2, wherein said transmission joint is a homokinetic joint having a sphere center placed on the intersection between the transverse direction passing through the transmission shaft and a direction parallel to the longitudinal direction.

4. Riding-saddle motor vehicle according to claim 1, wherein the transmission joint is a cardan joint.

5. Riding-saddle motor vehicle according to claim 1, wherein said rear wheels are connected to each other by means of a rigid axle which defines said rear wheel axle.

6. Riding-saddle motor vehicle according to claim 1, wherein said rigid axle is arranged between said first and second support arms.

7. Riding-saddle motor vehicle according to claim 1, wherein a rolling kinematism comprises the first support arm and the rigid axle which defines a second support arm.

8. Riding-saddle motor vehicle according to claim 1, wherein said end hinges, placed at opposite ends of the transmission shaft, overlap geometrically with homokinetic joints.

9. Riding-saddle motor vehicle according to claim 1, wherein a suspension unit is provided between the motor unit and the front frame.

10. Riding-saddle motor vehicle according to claim 9, wherein said suspension unit comprises a spring and/or damper.

11. Riding-saddle motor vehicle according to claim 1, comprising a differential which transmits the driving torque to said rear wheels.

* * * * *